United States Patent Office 3,275,150
Patented Sept. 27, 1966

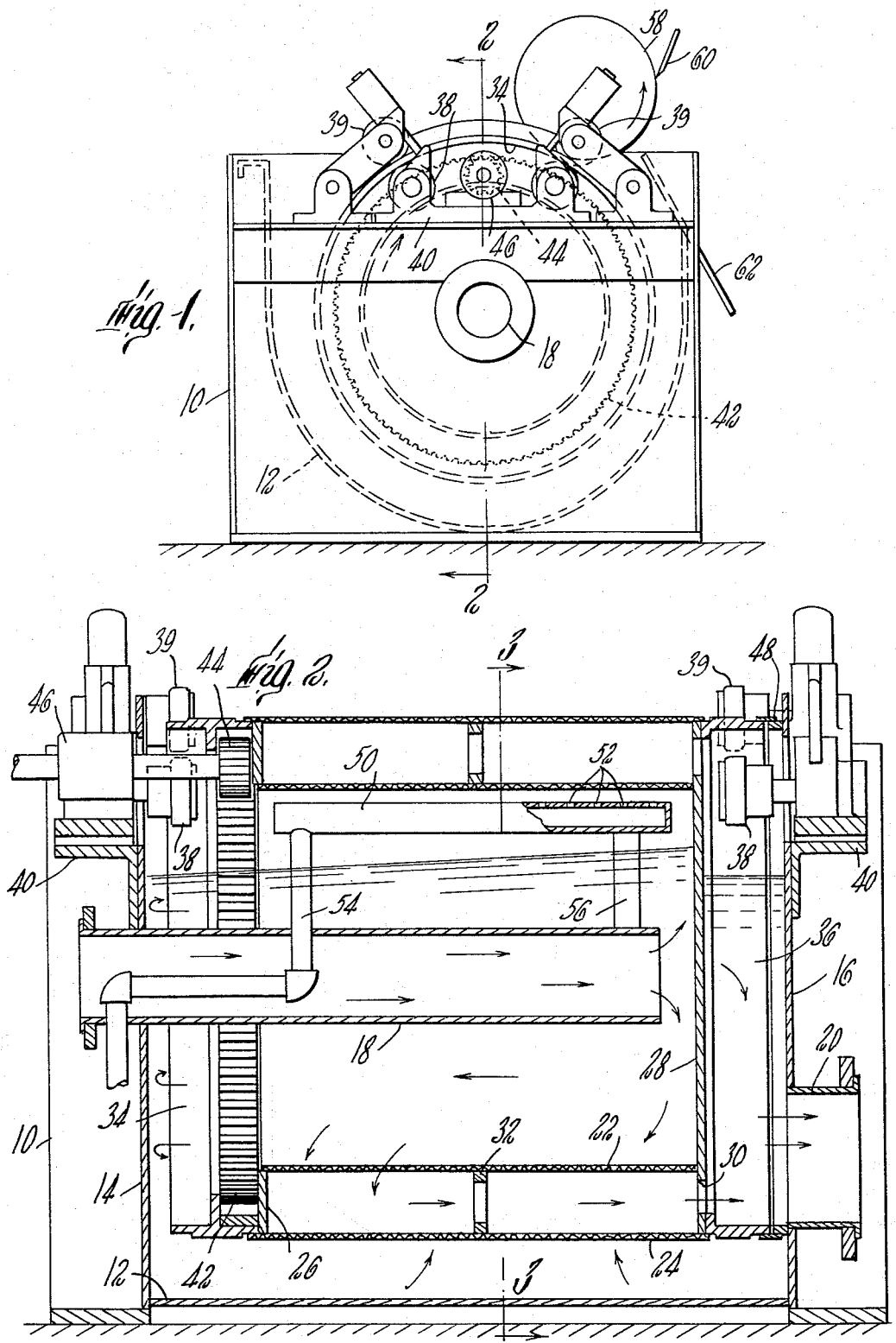

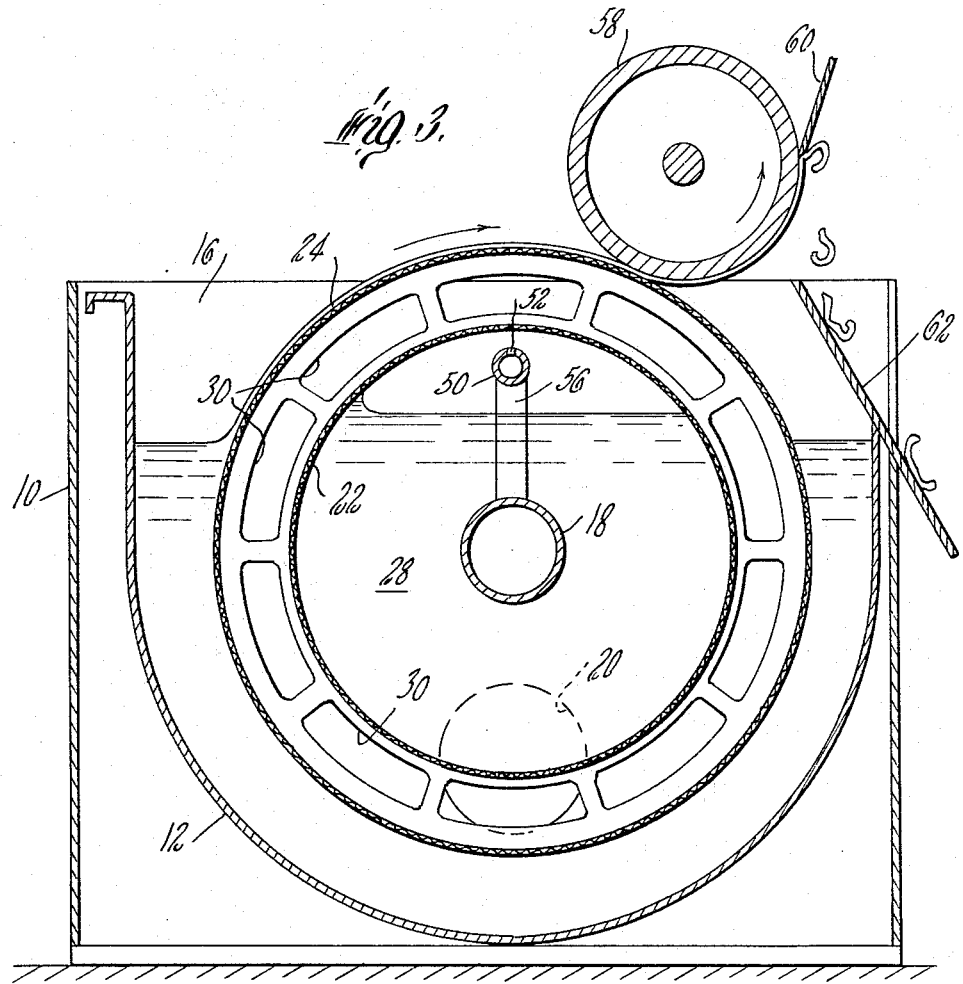
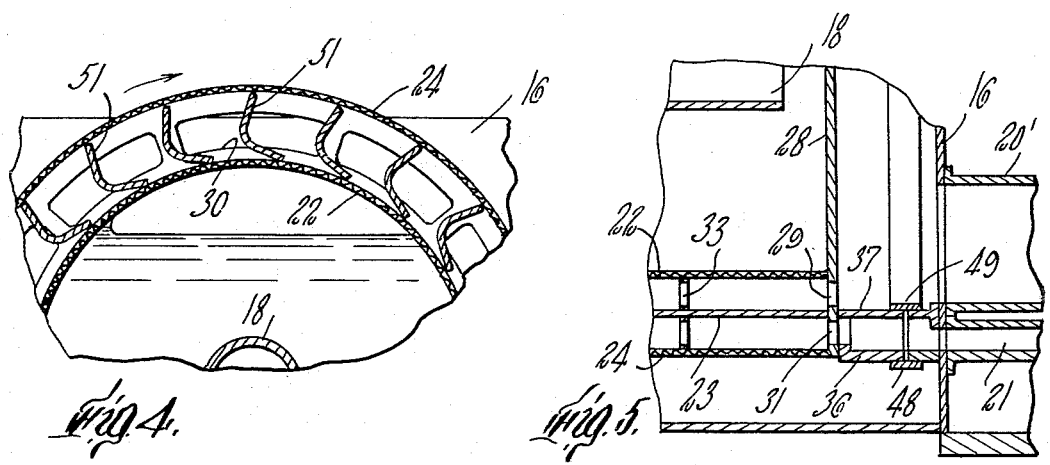

3,275,150
INTERNALLY FED DRUM FILTER
Ross A. Tait, Dorval, Quebec, Canada, assignor to Sherbrooke Machineries Limited, Montreal, Quebec, Canada, a corporation of Canada
Continuation of application Ser. No. 256,173, Feb. 4, 1963. This application Oct. 12, 1965, Ser. No. 500,478
11 Claims. (Cl. 210—327)

This application is a continuation of my co-pending application, Serial No. 256,173, filed February 4, 1963, and now abandoned.

This invention relates to rotary drum filters and more particularly to deckers useful in the thickening of slurries such as those involved in the manufacture of paper. Such apparatus generally comprises a drum revolving in a vat or tank containing relatively thin paper pulp stock, fibers from the stock being deposited on the outside of the drum from the liquid-solid mixture to form a filter cake, mat or coating of thickened slurry which is stripped or discharged from the drum as a portion of the drum rotates out of the stock in the vat. The excess fluid or filtrate is drained away and the discharged thickened slurry, mat or filter cake is processed further in the manufacture of paper.

Known equipment for the purposes above described is quite large and heavy and therefore needs a lot of space and requires considerable power to drive.

One object of the present invention is to reduce the size of rotary drum filter, particularly the length of the drum, so that for the same capacity of equipment, economies may result in the required space, weight of equipment and power needed to drive the same.

A further object is to increase the efficiency of gravity deckers, to the end that greater recovery of fibers may be attained from stock of a given consistency.

Another object is to provide such apparatus in which some operating parts are cleaned by operation of the machine and others are readily accessible and easily may be cleaned during operation of the machine, thus reducing "down" time.

These objects are met generally by providing in the vat a double shelled rotary filter drum composed of a pair of radially spaced concentric cylinders of screen wire of filter mesh and providing an inlet pipe for slurry to be filtered, the inlet pipe discharging the slurry adjacent a closed end of the inner screen cylinder. The slurry is thereby exposed first to the filter surface of the inner screen cylinder, filtering outwardly, then to the filter surface of the outer cylinder, filtering inwardly to deposit a filter cake. The effluent filtrate from both screens collects in the space between the cylinders, from which it is discharged, the filter cake being collected from the outside surface of the outer cylinder. The inner filter screen in this arrangement acts as a pre-thickener of the slurry and occupies space not otherwise used in conventional deckers. There is no need for the usual inlet box.

Other objects, advantages and further details of that which is believed to be novel and included in this invention will be clear from the following description and claims, taken with the accompanying drawings in which is illustrated an example of decker embodying the present invention and incorporating the concentric filter cylinders with internal feed and retroverted filtering discussed above.

In the drawings:

FIG. 1 is an elevational view of an exemplary drum filter according to this invention, as if seen from the intake end;

FIG. 2 is a longitudinal vertical sectional view through the machine on a somewhat larger scale, as if taken on line 2—2 of FIG. 1;

FIG. 3 is a transverse vertical sectional view on line 3—3 of FIG. 2, looking toward the filtrate discharge end of the machine;

FIG. 4 is a sectional view like the upper part of FIG. 3, showing a modification; and FIG. 5 is a sectional view like part of FIG. 2 showing a further modification.

In carrying out the objects of this invention, in one embodiment thereof an outer housing and supporting framework 10 encloses and carries the other parts of the apparatus. Occupying most of the inside of the housing is an inner stock tank or vat 12, shown here as of U-shape in transverse section, with ends closed by the end walls 14 and 16 of the housing. At one end of the machine a central inlet for the liquid-solid mixture or slurry is provided in the form of an intake pipe 18 which is connected to a suitable supply and extends from the wall 14 through substantially the entire length of the tank in a manner and for the purposes later described. The opposite end wall 16 is provided with an outlet fitting 20 for discharge of the filtrate near the bottom of the tank or vat.

Thickening of the slurry introduced into the vat is accomplished by a horizontally extending rotatably mounted and driven screen mesh filter drum composed of two concentric radially spaced cylindrical filter walls, an inner screen wall 22 and an outer screen wall 24. These cylinders are held in fixed concentric spaced relation one to the other at one end by an imperforate annular radially extending end wall 26 closing the space between the inner and outer screen cylinders at the intake end of the machine, that end of the inner screen cylinder 22 being open for reception of the intake pipe 18 and to permit slurrry to pass from the inside to the outside of the drum. The other end of the filter drum is provided with an imperforate central wall in the shape of a disk 28 closing the end of the inner screen cylinder near the open end of the intake pipe 18. This disk is extended to the outer cylinder to support the cylinders concentrically and is provided with flow openings 30 near its periphery leading from the annular space between the cylinders toward the outlet end wall 16. A suitable number of perforated annular cylinder supporting walls 32 may be provided as found necessary and desirable between the inner and outer screen cylinders to hold them properly spaced and yet allow free flow of filtrate in the annular space.

The double walled filter drum may be horizontally supported above the bottom of the vat and rotatably driven therein in any suitable fashion, for example by opposite outwardly extending trunnions (not shown) at the center of each end of the cylinder assembly. However, the cylinder support and drive illustrated are of a character shown and claimed in the patent application of Neil F. Putnam, U.S. Serial No. 3,855, filed January 21, 1960 (Canadian Serial No. 814,589, filed January 11, 1961). In this type of mounting and drive the filter drum is provided with axially outwardly extending cylindrical rims or end flanges 34 and 36, and the drum hangs and rides rotatably on pairs of bearing support rollers 38, these rollers extending into engagement with the inside of the cylindrical rims from suitable support brackets 40 on either end of the housing frame. Outer stabilizing rollers 39 may be used in conjunction with the rollers 38. The cylindrical flange at one end, shown here as the flange 34 at the stock inlet end of the machine, is provided with an internal gear ring 42 engaged by a spur gear 44 suitably rotatably driven by a motor 46 or other source of driving power which also may be carried by the bracket 40 at this end of the housing framework.

In operation, a thin slurry of pulp stock which it is desired to thicken is fed into the machine through the intake pipe 18 and the motor 46 is started to drive the double cylinder in a rotary fashion. The thin slurry is discharged against the imperforate center of the disk 28 of the drum and is distributed evenly therefrom against the inner surface of the screen 22 inside this cylinder. Some of the water or effluent will pass outwardly through the screen 22 so that as the slurry contacts the rotating inner screen it will become somewhat thickened and the partially thickened slurry will pass to the tank around the annular closed end 26, being directed thereby and by the end wall 14 to the space between the bottom and sides of the vat and the outside of the outer screen 24. The liquid filtrate which has passed through the screen 22 will flow through the openings 30 and be directed to the outlet 20, there being a sealing ring 48 on the end wall 16 slidably cooperating with the cylindrical flange 36 on the outside of the drum to prevent mixture of the filtrate with unfiltered slurry from the vat 12. Further filtration and stripping are described later.

In order to keep the filter surfaces on the inner screen 22 clean, a cleaning shower head 50 may be provided next to the filter face of the inner screen near the top of the machine, extending along practically the entire length of the cylinder above the working level of the slurry, as shown. The shower head has spray openings 52 which direct cleaning water upwardly against the wire 22 to scrub or clean it, water for this purpose being provided under pressure from a suitable source through a cleaning water inlet pipe 54, shown here as supported at one end by the slurry intake pipe 18. A post 56 may be provided to support the cleaning shower head at its far end.

FIG. 4 shows an alternative arrangement for cleaning the inner filter screen, where it is not desired to dilute the slurry by the addition of wash water. In this modification a series of spaced buckets or troughs 51 are mounted in the annular space between the inner and outer screens, and as the drum rotates, each trough lifts some filtrate above the outer surface of the inner screen and dumps it against the inner screen when above the level of the stock in the machine. This gives a reverse flow of some of the filtered liquid through the inner screen, to dislodge and wash back fibers which may have collected on its inner filtering surface. The shower head 50 may or may not be used in this modification, as desired.

After the semi-thickened slurry passes around the annular end wall 26 and outside of the screen 24 as above described, the pre-thickened slurry in the vat is directed against the rotating outer filter screen 24. Filtrate passes inwardly through the outer cylinder, into the annular space between the filter cylinders, flows through the openings 30 and is withdrawn through the outlet 20 along with filtrate from the inner cylinder. A coating or mat of thickened slurry or filter cake is consequently deposited on the outside of the cylinder 24 and by rotation of the drum member it is carried out of the vat to a discharge device for stripping the filter cake or thickened pulp mat from the outside of the cylinder. As shown, this stripper may be a suitable couch discharge roll 58 and doctor blade 60, or it may be a discharge roll of the character disclosed in U.S. patent application, Serial No. 772,928, filed November 10, 1958 by John P. Rich, and now U.S. Patent No. 3,032,201 (Canadian Serial No. 786,060, filed November 9, 1959). A stock slide or chute 62 may be arranged under the discharge roll to direct the stripped filter cake away from the machine.

FIG. 5 shows a further modification whereby the filtrate from the inner screen may be kept separate from the filtrate passing through the outer screen. In this form of the invention an imperforate cylindrical dividing wall 23 is provided between the inner screen wall 22 and the outer screen cylinder 24. Sets or rows of flow openings 29 and 31 circularly arranged near the edge of disk 28 lead respectively from the annular space between inner screen 22 and wall 23 and from the annular space between wall 23 and outer screen 24. Perforated annular supporting walls 33 hold the screen cylinders and dividing wall in properly spaced relation but allow free flow of the filtrates in the separate annular spaces provided by this construction. At the end of the drum, besides end flange 36, another circular flange 37 is provided on the drum, located between and separating the circular row of holes 29 from the row of holes 31.

In this form, instead of the single outlet fitting for mixed filtrates from inner and outer screens, an outlet pipe 20' is provided in the end wall 16 of the vat to draw off filtrate from the inner screen, and a separate outlet pipe 21 for filtrate from the outer screen. The sealing ring 48, as before, slidably cooperates with the flange 36, and in this case prevents mixture of the filtrate from the outer screen with unfiltered slurry in the vat and directs filtrate to the outlet pipe 21. An additional annular sealing ring 49 is provided on the end wall opposite the edge of the flange 37 and slidably cooperating therewith, to prevent mixture of the filtrate from the inner screen with the other filtrate and to direct the inner screen filtrate to the outlet pipe 20'.

The inner screen filtrate with this arrangement in most cases will be considerably more cloudy than the separate outer screen filtrate, which may be nearly clear. If the fiber content of the cloudy filtrate is high enough, it may be recirculated through the decker or through another machine to increase the total yield or efficiency of the operation in removing fiber from the slurry. Obviously either the shower head or reverse wash cleaning of the inner screen cylinder might be used with the separate cloudy-clear filtrate discharge of FIG. 5, depending upon the initial stock and the results desired.

If desired, the inner and outer screens may be of different gauge, taking advantage of the difference in consistency of the slurry inside and outside of the drum to improve the filtering action. A finer mesh screen on the inner cylinder may be preferred, to prevent undue fiber loss in the pre-thickening step.

As will be seen, the filtering of the slurry first outwardly against the inner filter screen and then in the other direction, inwardly against the outer filter screen from which the fully thickened slurry is collected, results in a machine which may be much shorter than machines of comparable output not using this inside-outside filter or retroverted filter arrangement. A given amount of filter area can be put in a smaller floor space than before.

The arrangement of this invention is advantageous not only because of the space saved in equipment but also because it can increase the yield from stock of a given consistency. The pre-thickening filtration through the inner cylinder proceeds with no difficulty, this screening operation being kept at an optimum rate because of the continuous removal of the usual hard skin of fibers from the screen by the shower or back-wash. A relatively fine inner screen mesh may therefore be used without clogging. Thereafter and when the pre-thickened slurry reaches the outer cylinder it is of a concentration that tends to form a comparatively loose mat of fibers (rather than a hard skin), this mat itself permitting the further filtration of slurry therethrough to build up a still greater depth of cake than would have been possible with a single screen drum decker using stock of the same initial consistency. The loose mat may be easily stripped from the outer cylinder.

Because stock is present both inside and outside of the filter drum, a more balanced bouyancy is produced so that some reduction in weight and strength of the parts safely may be made over usual requirements.

As the machine is operated, virtually all of the outer portions of the drum assembly in contact with the stock are exposed for inspection and cleaning above the vat, and the inner portions are kept clean by the cleaning water shower inside the inner cylinder 22 or by the reverse flow wash. There is but little obstruction to movement of slurry in the machine. Thus the apparatus may be used continuously for relatively long periods and cleaning may be effected from time to time without halting production. A product of uniform texture is therefore produced by this machine.

Proposed operating levels for the slurry are shown in FIG. 3 of the drawings, and it will be noted that the stock level in the inner cylinder will be as high as possible and still allow the shower pipe to clean the wire of any mat formed on it. The level on the outer cylinder will be very slightly less and of course, is governed by the maximum level in the inner cylinder with the difference being the friction loss or head loss of the transfer of the stock from the inner to the outer cylinder. These levels should be carried as high as possible to take advantage of the maximum amount of wire area for drainage purposes and also to use the maximum amount of head to produce flow through both sides of the cylinder.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

Having thus described my invention, I claim:

1. In a decker of the type having a vat for containing pulp stock,
   a drum rotatable within said vat adapted to collect filtered stock thereon as it rotates, and
   means for rotating said drum within said vat,
   said drum comprising
      an outer cylindrical filter screen,
      an inner cylindrical filter screen within and concentric with said outer filter screen, and
      means supporting said inner and outer filter screens in spaced relation to provide an annular open space therebetween,
      first fluid carrying means communicating with a source of pulp stock external to said vat and extending within said inner filter screen for supplying pulp stock to the inner surface thereof such that said pulp stock is partially thickened by said inner filter screen as said drum rotates, and
      second fluid carrying means communicating the inner surface of said inner filter screen with the outer surface of said outer filter screen for conveying partially thickened pulp stock from the former and against the latter as said drum rotates such that filtered stock is collected upon the outer surface of said outer filter screen.

2. In a decker of the type having a vat for containing pulp stock,
   a drum rotatable within said vat adapted to collect filtered stock thereon as it rotates, and
   means for rotating said drum within said vat,
   said drum comprising
      an outer cylindrical filter screen,
      an inner cylindrical filter screen within and concentric with said outer filter screen, and
      means supporting said inner and outer filter screens in spaced relation to provide an annular open space therebetween,
      first fluid carrying means communicating with a source of pulp stock external to said vat and extending within said inner filter screen for supplying pulp stock to the inner surface thereof such that said pulp stock passes longitudinally on and is partially thickened by said inner filter screen as filtrate passes outwardly therethrough to said annular open space during the rotation of said drum, and
      second fluid carrying means communicating the inner surface of said inner filter screen with the outer surface of said outer filter screen for conveying partially thickened pulp stock from the former and longitudinally on the latter during the rotation of said drum such that filtered stock is collected upon the outer surface of said outer filter screen as filtrate passes inwardly through said outer filter screen to said annular open space.

3. A decker according to claim 2 wherein an imperforate cylindrical wall is disposed within said annular open space for maintaining the filtrate passing inwardly through said outer filter screen separate from the filtrate passing outwardly through said inner filter screen.

4. In a decker of the type having a vat for containing pulp stock,
   a drum rotatable within said vat adapted to collect filtered stock thereon as it rotates, and
   means for rotating said drum within said vat,
   said drum comprising
      an outer cylindrical filter screen,
      an inner cylindrical filter screen within and concentric with said outer filter screen, and
      means supporting said inner and outer filter screens in spaced relation to provide an annular open space therebetween,
      first fluid carrying means communicating with a source of pulp stock external to said vat and extending within said inner filter screen for supplying pulp stock adjacent one end of the inner circumference thereof such that said pulp stock is partially thickened by said inner filter screen as filtrate passes outwardly therethrough to said annular open space during the rotation of said drum, and
      second fluid carrying means communicating the other end of the inner circumference of said inner filter screen with the outer circumference of said outer filter screen for conveying partially thickened pulp stock from the former and against the latter during the rotation of said drum such that filtered stock is collected upon the outer circumference of said outer filter screen as filtrate passes inwardly through said outer filter screen to said annular open space.

5. In a decker of the type having a vat for containing pulp stock,
   a drum rotatable within said vat adapted to collect filtered stock thereon as it rotates, and
   means for rotating said drum within said vat,
   said drum comprising
      an outer cylindrical filter screen,
      an inner cylindrical filter screen within and concentric with said outer filter screen, and
      means supporting said inner and outer filter screens in spaced relation to provide an annular open space therebetween,
      first fluid carrying means communicating with a source of pulp stock external to said vat and extending within said inner filter screen for supplying pulp stock adjacent one end of the inner circumference thereof such that said pulp stock is partially thickened by said inner filter screen as filtrate passes outwardly therethrough to said annular open space during the rotation of said drum, and
      second fluid carrying means communicating the other end of the inner circumference of said inner filter screen with the outer circumference of said outer filter screen for conveying partially thickened pulp stock from the former and against the latter during the rotation of said drum such that filtered stock is collected upon the outer circumference of said outer filter screen as filtrate passes inwardly through said outer filter screen to said annular open space, and means for scraping filtered stock from the outer circumference of said outer filter screen during the rotation of said drum.

6. In a decker of the type having a vat for containing pulp stock,
a drum rotatable within said vat adapted to collect filtered stock thereon as it rotates, and
means for rotating said drum within said vat,
said drum comprising
an outer cylindrical filter screen,
an inner cylindrical filter screen within and concentric with said outer filter screen, said inner filter screen including a closed end, and
means supporting said inner and outer filter screens in spaced relation to provide an annular open space therebetween,
first fluid carrying means communicating with a source of pulp stock external to said vat and extending within said inner filter screen for supplying pulp stock to the inner circumference thereof adjacent said closed end thereof such that said pulp stock is partially thickened by said inner filter screen as it passes longitudinally thereon during the rotation of said drum, and
second fluid carrying means communicating the end of the inner circumference of said inner filter screen opposite to the closed end thereof with the outer circumference of said outer filter screen for conveying partially thickened pulp stock from the former and longitudinally on the latter during the rotation of said drum such that filtered stock is collected upon the outer circumference of said outer filter screen, and
means for scraping filtered stock from the outer circumference of said outer filter screen during the rotation of said drum.

7. A decker according to claim 5 comprising in addition a shower head inside said inner filter screen, said shower head having spray openings therein directed toward said inner filter screen and being operatively connected to a source of water under pressure for supplying said water to the inner circumference of said inner filter screen as said drum rotates.

8. In a rotary drum filter for thickening slurry having a vat containing a stock of slurry,
a filter drum mounted for rotation within said vat,
means for rotating said drum within said vat, and
means for stripping thickened slurry from the outside of said drum, the combination of
said drum comprising an outer filter screen cylinder inwardly spaced from said vat, and
an inner filter screen cylinder concentric with and inwardly radially spaced from said outer filter screen cylinder to form an annular open space between said inner and outer filter screen cylinders,
disk means closing one end of said inner filter screen cylinder,
a slurry inlet pipe operatively connected to a source of slurry external to said vat and extending through the other end of said inner filter screen cylinder towards said disk means for supplying slurry to the inner circumference of said inner filter screen cylinder adjacent said disk means during rotation of said drum such that filtrate passes outwardly into said annular space as said slurry passes longitudinally over the inner circumference of said inner filter screen cylinder toward said other end thereof,
said other end of said inner filter screen cylinder being open for conveying the thickened slurry from said inner filter screen cylinder and across the outer circumference of said outer filter screen cylinder such that thickened slurry is held by said outer filter screen cylinder as filtrate therefrom passes inwardly therethrough into said annular open space,
an annular wall intermediate said inner filter screen cylinder and said outer filter screen cylinder closing said annular open space at said other end of said inner filter screen cylinder,
said annular open space at said one end of said inner filter screen cylinder being open for permitting flow of filtrate from said annular open space,
outlet means in said vat communicating with said annular open space at said one end of said inner filter screen cylinder for discharging filtrate from said vat, and
means for sealing said outlet means from the thickened slurry in said vat.

9. A rotary drum filter according to claim 8 wherein means are provided for washing said inner filter screen cylinder as it rotates, said washing means being operable above the level of stock in said vat.

10. A rotary drum filter according to claim 9 wherein said inner filter screen cylinder washing means comprises a shower head located near the top of said inner filter screen cylinder and above the level of stock in the vat, said shower head being operatively connected to a source of wash water under pressure.

11. A rotary drum filter according to claim 9 wherein said inner screen washing means comprises a plurality of buckets mounted in said annular open space between said inner and outer filter screen cylinders, each of said buckets raising filtrate in said annular open space above the level of stock in the vat and dumping said filtrate back against the inner filter screen cylinder as said drum rotates.

References Cited by the Examiner
UNITED STATES PATENTS

| | | | |
|---|---|---|---|
| 870,138 | 11/1907 | Stump et al. | 210—393 |
| 1,212,978 | 1/1917 | Malone | 210—393 |
| 1,279,949 | 9/1918 | Waterman | 210—403 |
| 1,504,020 | 8/1924 | Brackett | 210—236 |
| 1,636,739 | 7/1927 | Hertenbein | 210—333 X |
| 2,454,134 | 11/1948 | Burleson | 210—342 X |
| 2,748,951 | 6/1956 | Dubach | 210—403 |
| 3,025,213 | 3/1962 | Copeland | 210—325 X |

REUBEN FRIEDMAN, *Primary Examiner*.

J. DE CESARE, *Assistant Examiner*.